United States Patent [19]
Barbee

[11] 3,810,277
[45] May 14, 1974

[54] HIDE REMOVAL METHOD AND APPARATUS

[75] Inventor: Wilford O. Barbee, Charter Oak, Iowa

[73] Assignee: Iowa Beef Processors, Inc., Dakota City, Nebr.

[22] Filed: May 4, 1972

[21] Appl. No.: 250,209

[52] U.S. Cl. ................................................. 17/21
[51] Int. Cl............................................. A22b 5/16
[58] Field of Search ........................................ 17/21

[56] References Cited
UNITED STATES PATENTS
3,553,767  1/1971  Herzog.................................... 17/21
FOREIGN PATENTS OR APPLICATIONS
1,055,824  1/1967  Great Britain........................... 17/21

Primary Examiner—Robert Peshock
Attorney, Agent, or Firm—Browne, Beveridge, DeGrandi & Kline

[57] ABSTRACT

Hides are removed from animal carcasses by forming a passage between the hide and a mid-portion of the carcass, passing an exposed end of a rigid hide stripping loop through the passage, pulling the loop longitudinally to separate one end portion of the hide from the carcass and then pulling the remainder of the hide in the opposite direction to remove it from the carcass. The latter pulling step is performed at velocities which are inversely related to the tenacity of the various portions of the hide to the carcass.

12 Claims, 7 Drawing Figures

STEP 1
KNOWN SIDE PULLING OPERATION.

STEP 2
AIR KNIVES SEPARATE HIDE FROM FLESH AT MIDPORTION OF THE BACK.

STEP 3
LOOP INSERTED BETWEEN HIDE AND MIDPORTION OF THE BACK; LOOP RAISED TO PULL HIDE FROM UPPER PORTION OF THE CARCASS.

STEP 4
HANGING HIDE IS GRIPPED AND PULLED OVER THE HEAD TO SEPARATE IT FROM THE CARCASS.

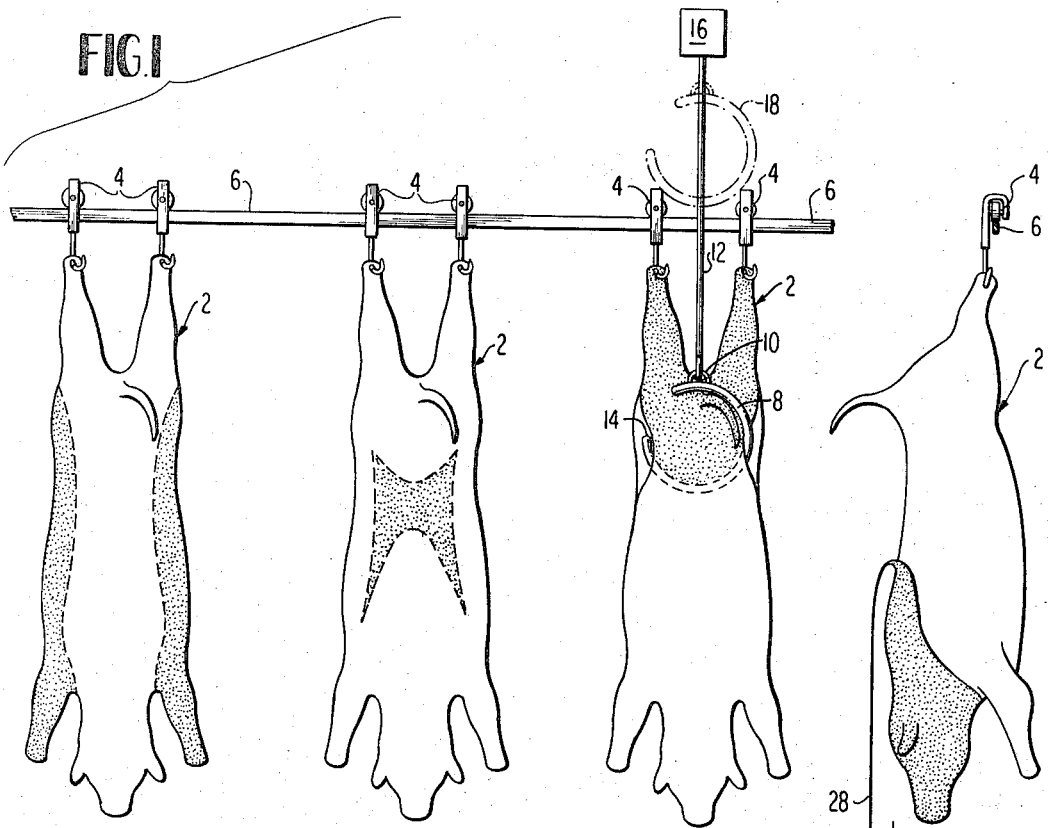
| STEP 1 | STEP 2 | STEP 3 | STEP 4 |
|---|---|---|---|
| KNOWN SIDE PULLING OPERATION. | AIR KNIVES SEPARATE HIDE FROM FLESH AT MIDPORTION OF THE BACK. | LOOP INSERTED BETWEEN HIDE AND MIDPORTION OF THE BACK; LOOP RAISED TO PULL HIDE FROM UPPER PORTION OF THE CARCASS. | HANGING HIDE IS GRIPPED AND PULLED OVER THE HEAD TO SEPARATE IT FROM THE CARCASS. |
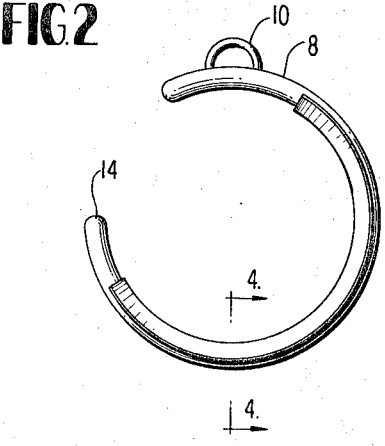 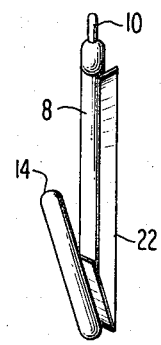 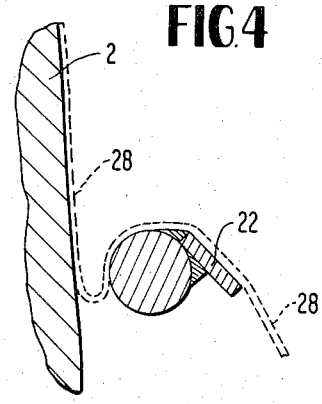

HIDE REMOVAL METHOD AND APPARATUS

This invention relates to a method and apparatus for removing hides from animal carcasses and is particularly suited for use in connection with a beef slaughtering facility.

Until recent years, hides were removed from animal carcasses by skilled personnel who used knives, either of a conventional type or air-actuated knives. More recently, as will be seen from the substantial volume of patent literature which has been published in the past 15 years, the industry has turned to mechanical hide pullers which forcibly remove the hides from the carcasses. These methods and apparatus take various forms, but in all instances known to the present inventor, the hides have been removed from the carcass by pulling only in one direction, sometimes changing the angle of the pulling force but not its general direction. The hide removal usually has been done by a simple pulling operation which is directed over-the-head or hindward, but there have been some proposals such as those described in U.S. Pat. Nos. 2,770,006 and 3,483,590 which have utilized a hide stripping member which is placed between the hide and the carcass and advanced longitudinally to effect the hide removal.

The means for creating the hide-pulling force in the prior art, insofar as it is known to the present inventor, has involved the application of a uniform velocity or force, sometimes far exceeding that required for hide removal and resulting in the removal of flesh from the carcass together with the hide.

The present invention seeks to avoid some of the disadvantages encountered with prior mechanical hide removing techniques in a relatively simple and expedient manner.

According to one concept of the invention, a method and apparatus is provided for removing a hide by pulling it forcibly from the carcass at velocities which are inversely related to the tenacity of the different portions of the hide to the carcass. The preferred manner of accomplishing this is by an hydraulic motor which is driven by a hydraulic pressure source incapable of maintaining a sustained operating pressure during movement of the motor, so that an increase in fluid pressure and pulling force is produced whenever the tenacity of the hide retards the velocity of the hide-pulling movement.

A second concept disclosed herein concerns the method and apparatus for stripping a hide from the carcass by projecting an exposed end of a stripping member between the hide and carcass, and moving the stripping member relative to the carcass to separate the hide from the carcass. This is accomplished preferably by a vertically oriented loop-shaped stripping member which is easily manipulated due to its support by a cable or similar elongated flexible body.

A third disclosed concept concerns a method of hide removal which involves stripping or pulling the hide in opposite directions so that hide removal is performed in the direction of the felt or grain to minimize the risk that flesh will be removed with the hide. This method involves the placement of a transverse stripping member between the hide and the carcass, while leaving the hide attached to the carcass on opposite sides of the stripping member, and then moving the striping member longitudinally of the carcass in one direction to strip the hide from one end of the carcass. According to this method, the hide is restrained during the movement of the stripping member due to its attachment to the other end of the carcass. The preferred method involves a further step of pulling the remainder of the hide from the other end of the carcass to effect complete separation.

A more complete understanding of a complete process which utilizes all of the aforementioned inventive concepts is shown in the accompanying drawings wherein:

FIG. 1 shows a carcass supported on a rail, being subjected to a series of operations which utilize the concepts of the invention;

FIG. 2 is a front elevational view of the preferred hide stripping member, which is a vertically oriented rigid loop member;

FIG. 3 is a side elevation of the hide stripping member of FIG. 2 showing the laterally projecting exposed end thereof;

FIG. 4 is a sectional view through the hide stripping loop as seen along the lines 4—4 in FIG. 2;

Figure 5:
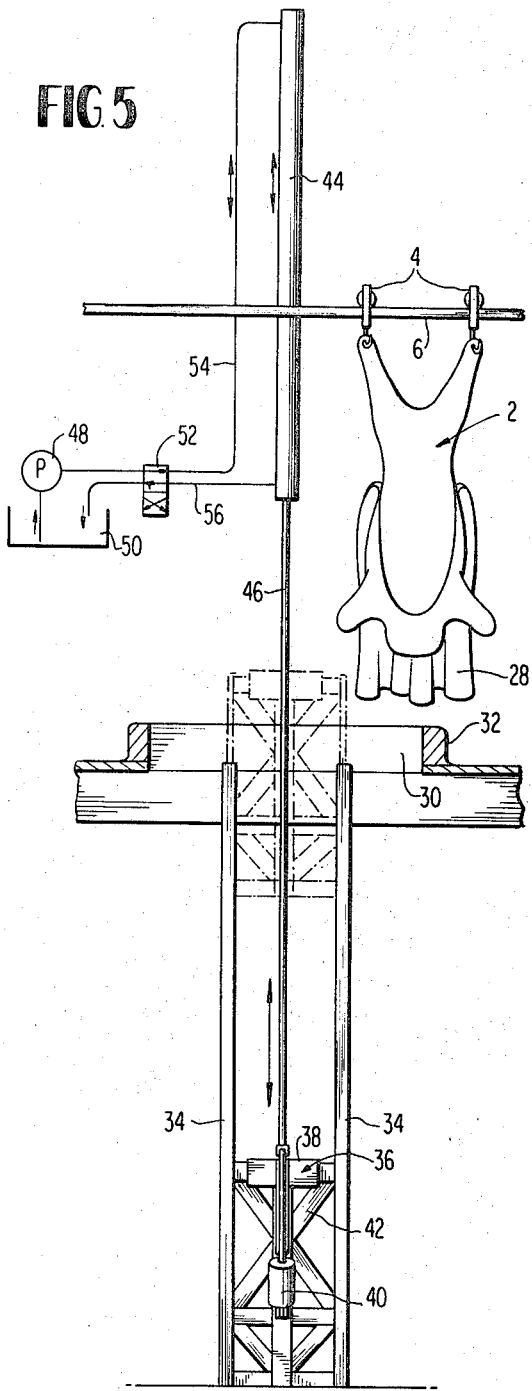
FIG. 5 shows a typical apparatus for the over-the-head pulling step, including the hydraulic system used to create the hide-pulling force.

Referring to FIG. 1, it will be seen that the carcass 2 is supported by its hind legs on trolleys 4 which ride on a rail 6. Initially, the carcasses are processed in a conventional fashion by slitting the underside of the hide longitudinally and using existing side-pulling apparatus to remove the hide from the areas which are shaded in FIG. 1, Step 1. The side-pulling apparatus may be any of several available types which are well-known in the meat packing industry. One side pulling machine is shown in U.S. Pat. No. 2,902,711. The workman called a "low backer" in the industry then uses a straight knife or air knife to skin the low back area so that the animal arriving for the novel steps of the process have the hide separated from the carcass in the shaded areas illustrated in FIG. 1, Step 1.

The next step, identified in FIG. 1, Step 2, involves the use of air knives or straight knives to separate the hide from the carcass in the mid-portion of the back, in the rib area of the carcass. The hide is separated from the carcass in the area shaded in FIG. 1, Step 2 so that there exists a transverse passage or opening between the carcass and the hide. At this stage, the hide is attached to the carcass both forwardly and hindwardly from the passage which has been formed. In the area below the passage, the hide is attached to the neck, shoulders and head of the animal. Above the passage, the hide is attached to the high back, rump and tail.

The next phase of the operation involves the removal of the hide from the areas lying above, i.e., hindwardly of the passage formed during Step 2. This is done by means of a stripping member which has an exposed end inserted through the passage. The hide stripping member is preferably in the form of a vertically oriented loop 8 which has an eye 10 connected to a cable 12 or other suitable elongated flexible member which will permit the manual insertion of the exposed end 14 of the loop 8 through the passage made during Step 2. The upper end of the cable 12 is connected to a hoist 16 or other actuating means which will raise the cable 12 and draw the loop 8 upwardly to the position shown in broken lines at 18.

Of course, during this operation, the upward forces exerted on the hide by the hide stripping loop 8 are counteracted by the weight of the carcass which continues to be attached to the neck, shoulders and head.

The vertical movement of the loop 8 causes the hide to be stripped from the loin, high back, flank, rump and tail of the carcass. The tail-covering portion of the hide is everted and then falls free, causing the hide to hang downwardly as shown in the illustration of Step 4.

It has been found that the removal of the hide during Step 3 is performed without tearing any meat and fat from the carcass. This is because the felt and grain of the animal grows toward the tail of the animal from about the middle of the back. The hide-removal Step 3 is in the direction of the felt and grain so that it avoids any pullout and loss of meat and fat, and results in a better looking carcass.

The carcass arriving at the station for Step 4 has the hide attached only to the fore quarters, neck and head of the animal. Here, the hide is pulled downwardly and over-the-head by engaging it with a gripping means 20 and pulling it downwardly. In this and the preceding step it is, of course, possible to move the carcass and leave the loop 8 or gripping member 20 stationary. During the latter hide-pulling operation, an electrical current may be passed through the animal in order to reduce any unnecessary pullout and loss of meat and fat.

The details of a preferred hide stripping loop 8 are shown in FIG. 2. The loop is formed of a bar of circular cross section, rounded at its opposite ends to avoid any sharp edges, and rolled into a generally circular body which extends about 300° about its center. The exposed end 14 of the loop 8 may project laterally as shown in FIG. 3 which will facilitate its insertion between the hide and the carcass and will minimize the risk of contaminating the loop by bringing it into contact with the outside surface of the hide. A trailing surface and edge of the carcass-contacting portions of the loop is provided by a stainless steel plate 22 which projects outwardly and rearwardly from the hide-contacting portions of the loop assembly. Welded fillets 24 and 26 are shown in FIG. 4 and provide a generally smooth outer surface of the device. As the hide is being pulled from the carcass, it will take the configuration shown by broken line 28 in FIG. 4 which has been found to ease the amount of effort required for hide removal.

FIG. 5 shows a suitable apparatus for accomplishing the final hide pulling step shown in FIG. 1, Step 4. At this station, the kill floor is provided with an opening 30 which leads to a basement or lower level of the facility. An upstanding safety curb 32 surrounds the opening and vertical trackways or guides 34 extend upwardly to the opening from the floor of the lower level. A carriage which has a gripping assembly 36 is vertically movable in the guide rails 34 between the lower position shown in solid lines and the upper position shown in broken lines in FIG. 5. The gripper assembly includes a pair of jaws, one of which is seen at 38 in FIG. 5. The jaws are moved between their carcass-gripping and carcass-releasing position by means of the hydraulic cylinder 40 in a manner which will be described in connection with FIG. 6. The jaw 38, cylinder 40 and their interconnecting members are mounted on the vertically movable carriage 42.

Vertical movement of the carriage 42 in the guide rail 34 is produced by the double-acting hydraulic ram 44 which is an hydraulic motor located in an upper level and connected to the carriage 42 by a rod 46.

Hydraulic pressure to the ram 44 is provided by a pump 48 which takes suction from a hydraulic reservoir 50 and discharges through a valve 52 to the hydraulic ram 44. When the valve 52 is in the position shown, the discharge pressure from the pump 48 goes through the line 54 and into the upper end of the ram 44, thereby moving the rod 46 and the carriage 42 of the gripper assembly downwardly. During this movement, any fluid beneath the piston in the ram 44 is returned to the reservoir 50 through the conduit 56 and valve 52.

When the valve 52 is shifted to its other operative position, the pressurized discharge fluid from the pump 48 goes through the valve 52 and into the conduit 56 before entering the ram 44. This will drive the rod 46 and carriage 42 upwardly while the hydraulic fluid above the piston and ram 44 is returned through the conduit 54 into the reservoir 50.

The disclosed hydraulic system is believed to be quite important, particularly in the respect that the pump 48 or other hydraulic fluid supply means is incapable of maintaining a sustained pressure when moving the ram 44. During initial movement of the ram 44 in a downward direction, there is a significant reduction in the hydraulic pressure in the line 54. As the hide-pulling operation progresses, the movement of the rod 46 and the connected gripper assembly 36 is restrained in areas where the hide is extremely tenacious to the carcass, so that the velocity of the gripper assembly 36 is retarded to become inversely related to the tenacity of different portions of the hide to the carcass. As this velocity is retarded, a hydraulic pressure buildup occurs to increase the hide-pulling force. In this manner, the amount of force exerted will be no more than that necessary to effect hide removal, so that there will not be excessive amounts of meat and fat removed from the hide.

Figure 6:
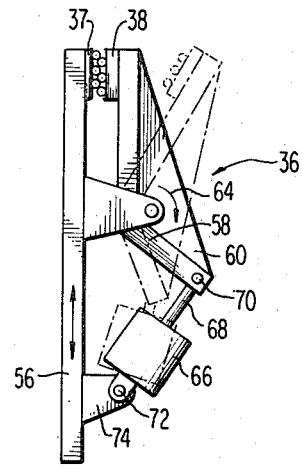
FIGS. 6 and 7 show two types of hide gripping carriages which may be used in the apparatus of FIG. 5.

A suitable form of gripper assembly 36 is shown in FIG. 6. The plate 56 is the carriage and, if desired, may be provided with rollers which ride in the guide rails 34 of the apparatus shown in FIG. 5. A gripper jaw 37 is stationarily mounted on the plate 56 and includes three rods which lie transverse to the direction of movement of the carriage. A complementary jaw 38 is shown in its operative and gripping relationship to the stationary jaw 37, with the rods on the jaw 38 interfitting between those on the stationary jaw 37. A carcass held between these members will assume a sinuous pattern and will be firmly engaged between the jaws.

The movable jaw 38 is supported on a swinging arm 58 which has a reinforcing flange 60. A pivot pin 62 passes through the reinforcing flange and permits movement of the arm 58 in the direction shown by the arrow 64. This movement is produced by the actuator 66 which may be hydraulic or electrical. The operating rod 68 of the actuator 66 is pivotally connected to the arm 58 at 70, whereas the other end of the actuator 66 is pivotally connected at 72 to a bracket 74 on the plate 56.

It will be evident that the gripper assembly of FIG. 6 will be in its closed position when engaging and pulling a hide, thereby pulling the hide downwardly to the basement level where it may be handled for further processing. The carriage 42 is then restored to its upper position shown in broken lines in FIG. 5 and the jaws 37 and 38 separated to the position shown in broken lines of FIG. 6, whereupon the lower hanging portion of the carcass will be placed between the jaws, the jaws closed, and the hydraulic ram 44 actuated for downward movement to remove the hide from the carcass by using only the appropriate amount of hide-pulling forces.

Figure 7:
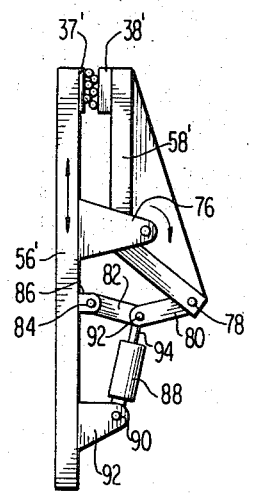

A modified type of gripper assembly is shown in FIG. 7. It is similar to that of FIG. 6 in the sense that a carriage 56' has a stationary jaw 37' and a bracket 76 which pivotally supports a swinging arm 58'. A movable jaw 38' is located on one end of the swinging arm 58', and the other end of the swinging arm 58' is pivotally connected at 78 to a toggle linkage having a pair of links 80 and 82. One end of the link 82 is pivotally connected at 84 to a bracket 86 on the plate 56'. A hydraulic actuator 88 has its lower end connected at 90 to a bracket 92 on the carriage plate 56', and its actuating rod 94 is pivotally connected at 92 both to the link 80 and the link 82.

Of course, retraction of the actuating rod 94 will move the links 80 and 82, causing the arm 58' to swing in a clockwise direction as viewed in FIG. 7, thereby opening the jaws 37' and 38'. Re-extension of the actuating rod 94 will return the jaws 37' and 38' to their closed position when it is desired to engage the hide of an animal being processed.

The foregoing description pertains to a preferred manner of practicing the broad inventive concepts outlined above. Those familiar with this art will realize that there are other ways in which these concepts may be utilized. For example, further work may show that a hide may suitably be removed by slitting it initially down the center of the back and then performing the operation shown in FIG. 1 along the underside of the animal; the hide stripping member may assume many forms other than the vertically oriented rigid loop; and, the hydraulic system of FIG. 5 may be used to remove a hide from an entire carcass or from any portion thereof, either pulling it over-the-head or in the opposite direction. If a hydraulic pressure source of greater capacity is used, a restrictive orifice may be placed in the delivery line 54 in order to provide the hydraulic fluid supply which is incapable of maintaining a sustained pressure. The ram 44 and path of movement of the carriage 42 may be horizontal if an appropriate roller is provided to change the direction in which the hide is pulled, so that the roller would cause a transition of the hide from the vertical movement which it assumes when being stripped from the carcass, to a horizontal movement as it moved together with the carriage 42. In view of these and other possible modifications to the disclosed subject matter, it is emphasized that the invention is not limited only to the disclosed embodiments, but encompasses modifications, improvements and variations thereto which fall within the spirit of the claims which follow.

I claim:

1. Apparatus for pulling a hide from a livestock carcass comprising
   support means for supporting a livestock carcass,
   gripping means for engaging the hide of a carcass on the support means,
   motive means for producing movement between the gripping means and the support means to pull the hide at different velocities which are inversely related to the tenacity of different portions of the hide to the carcass, whereby the velocity is lower when pulling the more tenacious portions of the hide than when pulling the less tenacious portions of the hide,
   said motive means including an hydraulic motor connected to the gripping means, and hydraulic fluid supply means having fluid connections with the hydraulic motor, said hydraulic fluid supply means being incapable of maintaining a sustained discharge pressure during movement of the gripping means by the hydraulic motor, whereby the hydraulic pressure delivered to the motor will diminish during initial movement of the gripping means and will not increase until the velocity of the gripping means is retarded by the tenacity of the hide to the carcass, whereupon the pressure generated by the hydraulic fluid supply means will increase to exert a greater pulling force.

2. The method of removing the hide from a livestock carcass comprising the steps of supporting the carcass, engaging the hide with a gripping member, and pulling the hide from the carcass at different velocities which are inversely related to the tenacity of different portions of the hide to the carcass, the pulling of the hide from the carcass being performed by introducing hydraulic fluid into a chamber of a hydraulic motor which produces relative movement between the carcass and the gripping member, permitting retardation in the velocity of the motor under the influence of and when pulling the more tenacious portions of the hide, and increasing the pressure of the fluid during such retardation to exert an increased pulling force on the more tenacious portions of the hide.

3. Apparatus for removing the hide from a livestock carcass, comprising,
   support means for supporting a carcass,
   hide stripping means including a stripping member and actuating means,
   said stripping member being in the form of a vertically oriented loop having an exposed end insertable between the hide and the carcass,
   said actuating means producing relative movement in one direction between the support means and the stripping member to separate the hide from the carcass as the hide is restrained in the other direction.

4. The apparatus of claim 3 wherein the exposed end of the stripping member is on one side of the loop, the actuating means includes an elongated flexible member attached to the other side of the loop, whereby the stripping member is manually manipulable to a position between the hide and the carcass.

5. The apparatus of claim 3 wherein the exposed end of the stripping member projects laterally to facilitate its insertion between the hide and the carcass and to minimize the risk of bringing the stripping member into contaminating contact with the outside surface of the hide.

6. The method of removing the hide from a livestock carcass comprising the steps of
   forming a passage between the hide and the midportion of the back of the carcass while leaving at least a portion of the hide attached to a foreportion of the carcass, inserting a stripping member through the passage, moving the stripping member in a hindward direction to remove the hide from the hind portion of the carcass, and pulling the hide forwardly to separate it from the carcass.

7. The method of claim 6 wherein all steps recited are performed while the carcass is suspended from its hind legs, so that the force created by the hindward movement of the skinning member is counteracted by the weight of the carcass.

8. The method of claim 6 wherein the stripping member is a rigid loop, and the step of moving the stripping member is accomplished by pulling the rigid loop.

9. The method of claim 8 wherein the rigid loop is pulled by a flexible member which permits manual manipulation of the loop when inserting it through the passage.

10. The method of claim 8 wherein the rigid loop has an exposed end for insertion through the passage.

11. The method of removing the hide from a livestock carcass comprising the steps of inserting a stripping member between the hide and the carcass, while leaving the hide attached to the carcass on the opposite sides of the stripping member, moving the stripping member longitudinally of the carcass in one direction to strip the hide from a portion of the carcass, said hide being restrained during such movement by its attachment to the carcass in the opposite direction from the stripping member.

12. The method of claim 11 including the further step of pulling hide in the opposite direction to separate it from the carcass.

* * * * *